US012234707B2

United States Patent
Alali et al.

(10) Patent No.: US 12,234,707 B2
(45) Date of Patent: Feb. 25, 2025

(54) METHOD FOR DOWNHOLE INSTALLATION OF BATTERIES WITH RECHARGING AND ENERGY HARVESTING SYSTEMS IN DEDICATED COMPARTMENTS

(71) Applicant: SAUDI ARABIAN OIL COMPANY, Dhahran (SA)

(72) Inventors: Eyad Ali Alali, Dammam (SA); Mohammed Abdullah Bataweel, Dhahran (SA); Norah W. Aljuryyed, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 5 days.

(21) Appl. No.: 17/930,592

(22) Filed: Sep. 8, 2022

(65) Prior Publication Data

US 2024/0084673 A1    Mar. 14, 2024

(51) Int. Cl.
*E21B 41/00*        (2006.01)
*E21B 7/06*         (2006.01)
*H02J 50/00*        (2016.01)

(52) U.S. Cl.
CPC .......... *E21B 41/0085* (2013.01); *E21B 7/061* (2013.01); *H02J 50/001* (2020.01)

(58) Field of Classification Search
CPC ..... E21B 7/061; E21B 41/0085; H02J 50/001
See application file for complete search history.

(56) References Cited

U.S. PATENT DOCUMENTS

| | | | |
|---|---|---|---|
| 5,435,400 A | 7/1995 | Smith | |
| 5,458,197 A | 10/1995 | Chan | |
| 5,762,149 A | 6/1998 | Donovan et al. | |
| 5,868,210 A | 2/1999 | Johnson et al. | |
| 5,960,883 A | 10/1999 | Tubel et al. | |
| 6,119,780 A | 9/2000 | Christmas | |
| 6,318,457 B1 | 11/2001 | Den Boer et al. | |
| 6,953,094 B2 * | 10/2005 | Ross | G01V 11/002 166/50 |
| 6,981,553 B2 | 1/2006 | Stegemeier et al. | |
| 7,090,009 B2 | 8/2006 | Zupanick | |
| 8,127,833 B2 | 3/2012 | Pabon et al. | |
| 10,487,647 B2 | 11/2019 | Song et al. | |

(Continued)

OTHER PUBLICATIONS

Noui-Mehidi, Mohamed Nabil and Ahmed Rizq, "Downhole Energy Harvesting From an Isothermal Well Zone by Converting a Differential Pressure into a Differential Temperature and Combining Thermo-Generators for Smart Well Completions", SPE-198145-MS, Society of Petroleum Engineers, Oct. 2019, pp. 1-8 (8 pages).

(Continued)

*Primary Examiner* — Robert E Fuller
*Assistant Examiner* — Lamia Quaim
(74) *Attorney, Agent, or Firm* — Osha Bergman Watanabe & Burton LLP

(57) ABSTRACT

A system includes a well extending through an underground formation, a primary tunnel extending a length outwardly from the well at a first axial location along the well, a battery installed in the primary tunnel, recharging equipment connected to the battery, and electrically powered downhole equipment positioned in the well, wherein the downhole equipment is connected to the battery.

20 Claims, 8 Drawing Sheets

(56) References Cited

U.S. PATENT DOCUMENTS

| | | | |
|---|---|---|---|
| 2003/0048697 A1 | 3/2003 | Hirsch et al. | |
| 2004/0043501 A1 | 3/2004 | Means et al. | |
| 2005/0012340 A1 | 1/2005 | Cousins | |
| 2009/0277629 A1* | 11/2009 | Mendez | E21B 47/14 166/250.01 |
| 2012/0067567 A1* | 3/2012 | Rytlewski | E21B 41/0085 166/250.01 |
| 2012/0305241 A1 | 12/2012 | Rytlewski et al. | |
| 2015/0027507 A1 | 1/2015 | Noui-Mehidi | |
| 2016/0069173 A1* | 3/2016 | Castro | E21B 43/26 166/308.1 |
| 2017/0130542 A1* | 5/2017 | Savage | E21B 21/10 |
| 2019/0353011 A1 | 11/2019 | Ross et al. | |
| 2020/0095847 A1 | 3/2020 | Signorelli et al. | |
| 2021/0025241 A1* | 1/2021 | Crichlow | G21F 9/24 |

OTHER PUBLICATIONS

"Downhole Batteries for MWD and LWD Applications", MWD/LWD Downhole Batteries—Excel Battery Co., Access Date: Sep. 7, 2022, URL: <https://excellbattery.com/products/downhole-batteries/> (2 pages).

Hamlehdar, Maryam, et al., "Energy Harvesting from Fluid Flow using Piezoelectrics: A Critical Review", Renewable Energy: An International Journal, doi:10.1016/j.renene.2019.05.078, 2019 (43 pages).

Jones, Willie, "Waste Heat to Electricity Breakthrough: Northwestern University boosts material's ability to transform heat into current by refining it on three size scales", IEEE, Sep. 19, 2012, URL: <https://spectrum.ieee.org/semiconductors/materials/waste-heat-to-electricity-breakthrough> (5 pages).

Office Action Issued in Related U.S. Appl. No. 17/930,586, Mailed on Apr. 5, 2024, 21 pages.

International Search Report issued in corresponding International Application No. PCT/US2023/032166; mailed Dec. 13, 2023 (5 pages).

Written Opinion of the International Searching Authority issued in corresponding International Application No. PCT/US2023/032166; dated Dec. 13, 2023 (8 pages).

\* cited by examiner

METHOD FOR DOWNHOLE INSTALLATION OF BATTERIES WITH RECHARGING AND ENERGY HARVESTING SYSTEMS IN DEDICATED COMPARTMENTS

BACKGROUND

Wells are drilled into subsurface formations to produce valuable resources, such as oil and gas. A well is typically drilled by moving a rotating drill bit attached at an end of a drill string through the earth to form a wellbore. The drill string and attached drill bit may be rotated and extended underground using rig equipment at the surface of the well. Drilling fluid, also referred to as "drilling mud" or simply "mud," is used to facilitate drilling wellbores into the earth. As the drill string and bit are rotated to drill the wellbore, one or more mud pumps at the surface of the well circulates drilling fluid through the well, where the drilling fluid may flow from the surface of the well, through the drill string, out the end of the drill string, and back up the well through an annulus formed around the outside of the drill string to return to the surface of the well. As the wellbore is formed, strings of casing and/or liner may be installed to line the wellbore wall. Casing may be installed in the well by pumping cement into an annulus formed between the casing string and the wellbore wall. Wells may be drilled to extend vertically, horizontally, or other direction through the earth.

Radial drilling refers to a method of drilling small generally radially extending tunnels (typically a few inches in diameter) extending from a main well into the formation strata (typically to a maximum of about 300-400 feet). Radial drilling is commonly used to access trapped oil or gas in the near-well formation and stimulate production. Radial drilling tools are often deployed through the main well using coiled tubing, although slickline has also been used. Unlike drill string, which is made of multiple rigid sections of pipe that are threaded together in an end-to-end fashion, coiled tubing is a long, continuous length of pipe that is wound on a spool to be stored or transported and then straightened to be pushed into a well.

Radial drilling may include radial jet drilling, where a high-pressure fluid is jetted through radial drilling tools to penetrate and form the tunnel, or mechanical radial drilling, where a radial drilling bit (rotated by a downhole mud motor) may be used to drill the tunnel. When radially drilling from a cased well, radial drilling may include a combination of milling through the casing with a radial drilling bit and jetting the tunnel from the milled hole in the casing.

Radial drilling tools may vary depending on the radial drilling technique being used and may include, for example, a downhole mud motor, a jetting nozzle and hose, a milling bit, and others. For example, a typical radial drilling system 100 is shown in FIG. 1, which may be used to drill a tunnel 101 extending radially from a cased main well 102 through a formation 103. A whipstock 104 (also referred to as a deflector shoe) may be lowered into the main well 102 via a tubing 105. One or more centralizers 109 may be positioned around the tubing 105 to keep the whipstock 104 centered within the tubing 105. Coiled tubing 106 having radial drilling equipment attached at the end may be extended through the tubing 105. The radial drilling equipment may include a downhole mud motor 107 and a radial drilling bit 108 rotatable by the mud motor 107 via a flexible pipe 110. As the mud motor 107 rotates the radial drilling bit 108, the radial drilling bit 108 may be directed through the whipstock 104 at a turn 111 ("heel") to contact and cut through the main well casing into the formation 103 around the main well 102. In radial jet drilling operations, the radial drilling bit 108 may be removed after initiating the tunnel 101 from the main well 102, and a high-pressure nozzle and hose may be extended through the whipstock 104 to eject a high-pressure fluid to hydraulically impact and extend the tunnel 101 into the formation 103.

Radial drilling is different from coiled-tubing sidetracking procedures and conventional horizontal drilling, which may be used to drill branch wellbores, e.g., for multilateral wells. A multilateral well is a well with two or more branch wells drill from a main well that may allow one well to produce from several reservoirs via the branch wells (rather than drilling multiple separate wells from the surface to the different reservoir areas). A major difference between radial drilling and conventional sidetracking or horizontal drilling is that radial drilling generally operates at a much smaller scale, e.g., 2 to 4 orders of magnitude smaller than conventional sidetracking and horizontal drilling. For example, branch wellbores (sometimes referred to as laterals) may be drilled at an angle from the main well around a heel that is typically hundreds or thousands of feet in length. In contrast, radial drilling typically involves a change of direction with a tighter radius of curvature that occurs entirely around a whipstock, e.g., with a heel ranging from a few inches to a few meters. For example, radial drilling techniques may produce tunnels extending from a main well at an angle of 90 degrees or less. Due to the small radius of curvature from radially drilled tunnels, longer conventional drilling tools used in drilling branch wells would not be able to fit in radially drilled tunnels.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to methods that include providing a well extending through an underground formation, using radial drilling to drill a primary tunnel extending in an outwardly direction from the well at a first axial location along the well, installing a battery in the primary tunnel, and connecting the battery to downhole equipment in the well.

In another aspect, embodiments disclosed herein relate to methods that include determining energy requirements for downhole equipment to be used in a well and designing a power supply system for the downhole equipment to meet the energy requirements. Designing the power supply system may include selecting an amount of rechargeable batteries to power the downhole equipment and selecting a type of recharging equipment to recharge the rechargeable batteries. A tunnel system may be designed based on the designed power supply system, wherein designing the tunnel system includes selecting a number of tunnels to fit the designed power supply system. At least a primary tunnel extending in an outwardly direction from the well may be drilled using radial drilling to drill the designed tunnel system in the well. The designed power supply system may be installed in the well, wherein at least one component of the designed power supply system is installed in the primary tunnel.

In yet another aspect, embodiments disclosed herein relate to systems that include a well extending through an underground formation, a primary tunnel extending a length outwardly from the well at a first axial location along the well, a battery installed in the primary tunnel, recharging equipment connected to the battery, and electrically powered downhole equipment positioned in the well, wherein the downhole equipment is connected to the battery.

Other aspects and advantages will be apparent from the following description and the appended claims.

BRIEF DESCRIPTION OF DRAWINGS

Wherever possible, like or identical reference numerals are used in the figures to identify common or the same elements. The figures are not necessarily to scale and certain features and certain views of the figures may be shown exaggerated in scale for purposes of clarification.

DETAILED DESCRIPTION

Figure 1:
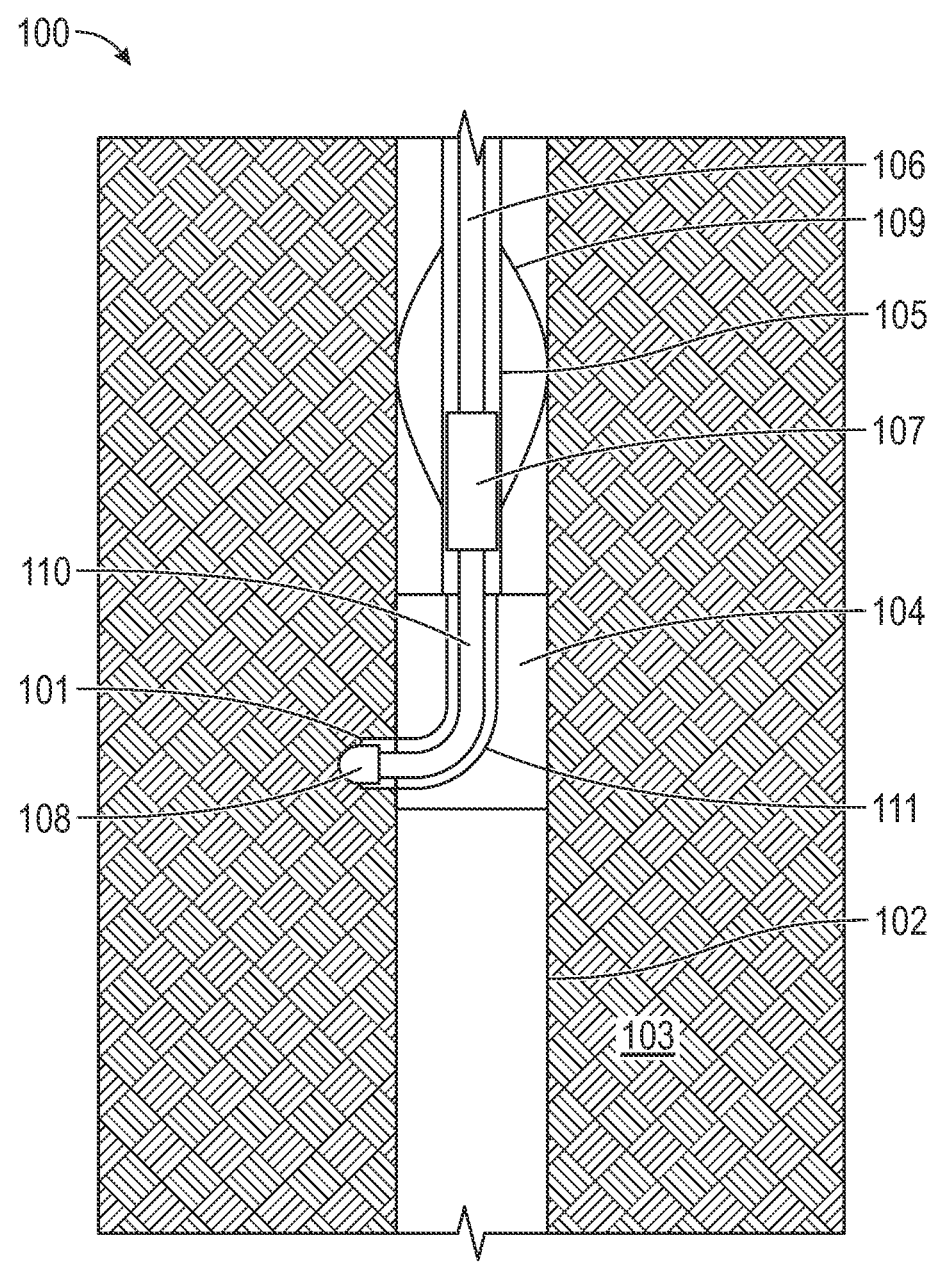
FIG. 1 shows an example of a conventional radial drilling technique in a downhole well.

Embodiments of the present disclosure are described below in detail with reference to the accompanying figures. In the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Embodiments disclosed herein relate generally to downhole power supply systems for downhole equipment in a well. Downhole power supply systems according to embodiments of the present disclosure may include one or more batteries stored downhole in one or more small tunnels (or ratholes) formed off a well. The batteries may be used to provide energy for electrically powered downhole equipment (e.g., sensors and downhole smart completions and tools). The batteries may be rechargeable using recharging equipment that may either be stored downhole in an additional tunnel or connected to a power source at a surface of the well. The tunnels used for storing components of a downhole power supply system may be drilled using reservoir tunneling techniques, such as radial drilling, which may be conducted using rig, rigless, workover or coiled tubing operations. By using systems and methods according to embodiments of the present disclosure to store batteries in tunnel(s) off a well, well operations may be performed without having the batteries interfere.

For example, conventional oil and gas wells typically need to be accessed for well intervention operations, to perform a number of different tasks other than drilling (e.g., to alter the state of the well, provide well diagnostics, or manage production from the well). However, conventional downhole completion operations have limited access and small space for device installations in the well being produced. By providing a battery in a tunnel off the well according to embodiments of the present disclosure, downhole equipment in the well may be powered without interference from the battery and/or without removing production equipment for a separate recharging or battery replacement operation. For example, when one or more batteries are stored in tunnel(s) formed off a well, downhole tools may freely move through the well past the battery/tunnel installation(s) to perform one or more well operations, while at the same time allowing the batteries to power downhole equipment fixed in the well.

According to embodiments of the present disclosure, batteries stored in tunnels off a well may be rechargeable batteries and may be recharged while being stored in the tunnels. For example, while being held in a tunnel, a battery may be recharged from a downhole energy harvesting device or from surface power, e.g., via a connected e-line or via a docking device run downhole on coiled tubing or wireline. FIGS. 2-5 show different examples of power supply systems according to embodiments of the present disclosure, where a battery stored in a tunnel may be recharged using different recharging equipment.

Figure 2:
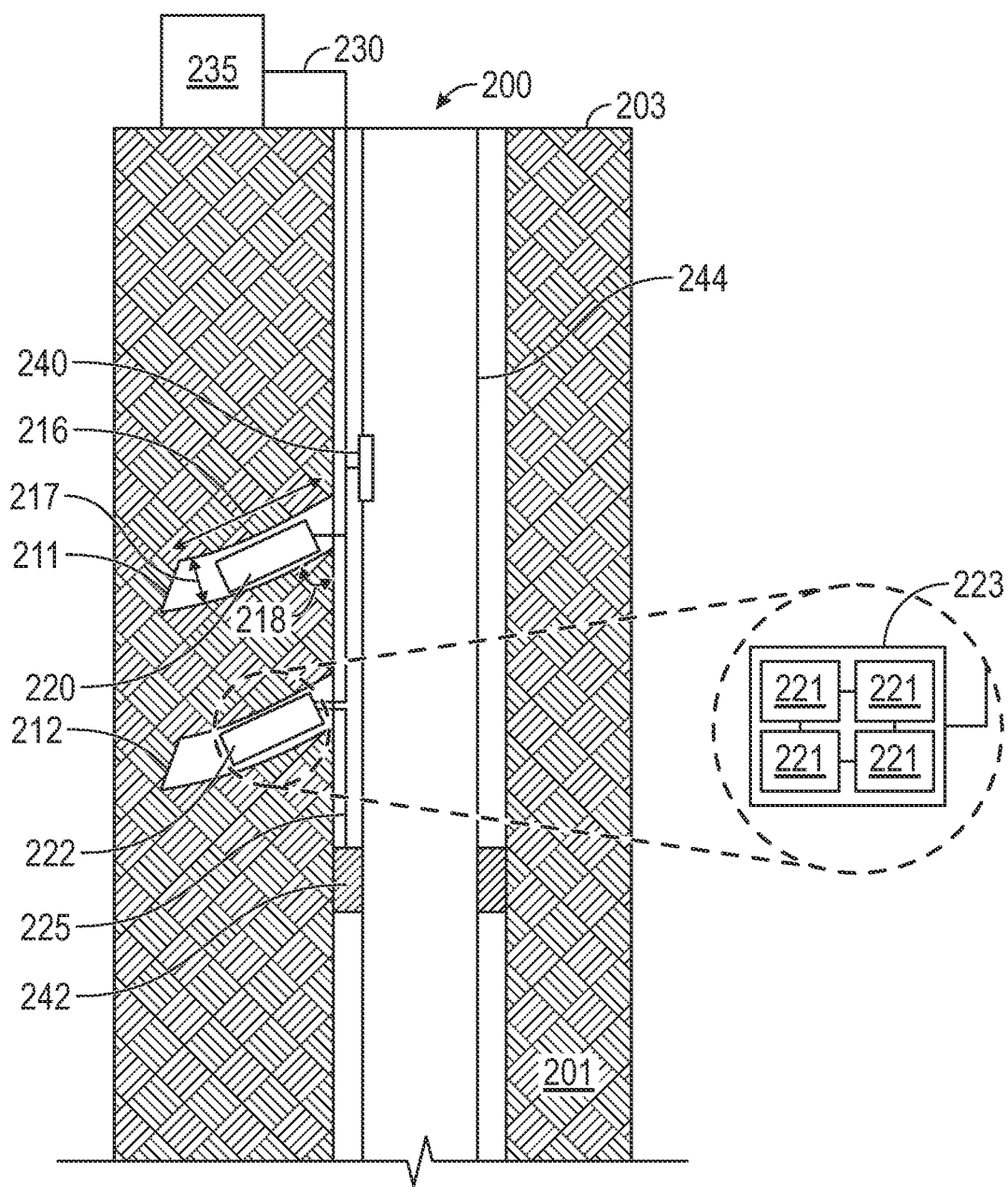
FIG. 2 shows an example of a power supply system in a well according to embodiments of the present disclosure.

FIG. 2 shows an example of a power supply system according to embodiments of the present disclosure, including at least one battery 220 and at least one recharging device 230, provided along a well 200 extending through an underground formation 201. The well 200 may be drilled using conventional well drilling techniques and may be cased or uncased. For example, a drill bit attached at an end of a drill string may be rotated and moved through the formation 201 to drill a wellbore wall as drilling fluid is circulated through the well. After a wellbore is drilled, a length of the wellbore may be cased or remain uncased, where casing includes lowering a casing string into the wellbore and pumping cement between the annulus formed between the wellbore wall and the casing string. However, other drilling and casing/lining techniques known in the art may be used to form a well 200.

The power supply system may include one or more tunnels 211, 213 extending outwardly from the well 200 at different axial and/or circumferential locations around the well 200. In the example shown in FIG. 2, the system includes multiple tunnels located at different locations around the well 200, including a primary tunnel 211 located at a first axial location along the well 200 and a secondary tunnel 212 located at a second axial location along the well 200. However, in other embodiments, multiple tunnels may be formed off a well in other locations, such as in the same axial location but in different circumferential locations around the well. In some embodiments, less than two or more than two tunnels may be formed along the wells. The amount and locations of tunnels extending from a well 200 may vary based on the design of the power supply system (e.g., the number of batteries being used).

The tunnels 211, 212 may be formed using tunneling techniques known in the art, such as radial jet drilling or mechanical radial drilling. In some embodiments, a radial drilling tool may be deployed using coiled tubing, where the radial drilling tool may include a radial drilling bit attached at an end of a flexible line. The coiled tubing may be used to direct the radial drilling tool through a whipstock to radially drill a small tunnel extending outwardly from a well. The coiled tubing may be large diameter (e.g., 2 inches or more) coiled tubing, which generally has high axial and torsional stiffness, or small diameter (e.g., ⅞ inch) coiled tubing, which has limited axial stiffness and low resistance to torque. The coiled tubing may act as both the retrieval line for the radial drilling tool and the power supply line for the radial drilling tool. In some embodiments, a tunnel may be formed using sidetrack drilling, which is a technique conventionally used to drill a new branch wellbore from an existing well that has poor or no productivity. When using sidetrack drilling techniques, instead of drilling a new wellbore to increase production through the new wellbore, the sidetrack drilling may be used to drill a relatively shorter distance to a "dead-end," where the formed tunnel may be long enough to store components described herein, but not long enough to reach additional production locations.

Tunnels 211, 212 drilled off a well 200 may be distinguished from a typical well (e.g., a main well extending from a surface to an underground formation or a branch well extending from a main well to another formation) in that the tunnels 211, 212 may be limited in size and location so as not to reach a producing reservoir. In other words, a tunnel 211, 212 may be drilled within a non-producing area off the well, such that fluids do not flow from the surrounding formation through the tunnel and into the well 200. Additionally, or alternatively, tunnels may be distinguished from a typical well in size, where tunnels may be much smaller than the well 200. For example, tunnels 211, 212 may have a size small enough to where conventional well tools would not fit.

According to embodiments of the present disclosure, tunnels 211, 212 may extend a length 216 outwardly from the well 200 and may have a diameter 217. The length 216 and diameter 217 of a tunnel may vary depending on, for example, the tunneling technique used to form the tunnel and the component being stored in the tunnel. According to embodiments of the present disclosure, the length 216 of a tunnel may range, for example, between 3 feet and 300 feet. In some embodiments, the length 216 of a tunnel 215 may be less than 300 feet (e.g., less than 200 feet, or less than 100 feet). The diameter 217 of a tunnel may range, for example, between 1 inch and 6 inches. In some embodiments, tunnels 211, 212 may be formed having diameters that are less than 4 inches. In some embodiments, tunnels 215 may be designed to have a smaller diameter than the diameter of the well 200 from which it extends. For example, well 200 diameters may range from about 9 inches to 3 inches, while tunnels 215 may have a diameter ranging from about 7 inches to less than 1 inch. In some embodiments, tunnels 215 may be as small as 0.5 inches in diameter extending from a well with a 3-inch diameter casing.

Additionally, tunnels 211, 212 may extend outwardly from a well 200 at an axial angle 218 measured between the wall of the well 200 and the wall of the tunnel adjacent to the opening of the tunnel, where the axial angle 218 may range, for example, from about 45 degrees to about 90 degrees. The axial angle 218 may depend on the tunneling technique. For example, sidetrack drilling may have a "dogleg" severity of less than 45 degrees/100 ft of course length.

One or more batteries 220, 222 may be installed within one or more tunnels 211, 212 extending off the well 200. The batteries 220, 222 may be designed to have an overall size and shape that fits within a tunnel. Additionally, the batteries 220, 222 may be designed to withstand downhole conditions, such as high temperature and pressure, wellbore fluids, etc. For example, in some embodiments, the batteries 220, 222 may include lithium cell batteries. In some embodiments, batteries 222 may be provided as a battery assembly, which may include multiple individual battery units 221 connected together in series or in parallel, as a battery bank, to increase the watt-hours of the battery assembly, which may increase the duration until recharging is needed. In some embodiments, battery assemblies may include a protective housing 223, which may house one or more battery units 221. The protective housing 223 may be designed to enclose and protect the battery units 221 from the well environment. The housing 223 may include a connection portion, which may allow connection of the battery units 221 inside the housing 223 to other components in the power supply system and/or to downhole equipment used in the well 200.

The power supply system shown in FIG. 2 may also include recharging equipment connected to the batteries 220, 222. For example, as schematically shown in FIG. 2, the recharging equipment may include a recharging device 230 provided in the form of an e-line that electrically connects the batteries 220, 222 to a power source 235 at the surface 203 of the well 200. An e-line refers to an electrical cable that is capable of transmitting electricity and data. An e-line may be run into the well (e.g., in an intervention run) on a frequent basis to collect downhole data and recharge the batteries 220, 222. When a battery (e.g., 220, 222) needs recharging, power may be sent from the power source 235 at the surface to the battery for recharging. In some embodiments, data indicating when the battery is running low may be sent through the e-line as an alert to recharge the battery.

Additionally, the batteries 220, 222 may be connected to one or more downhole equipment 241, 242 positioned in the well 200 to electrically power the downhole equipment 241, 242. The batteries 220, 222 may be electrically connected to downhole equipment 241, 242 using electric cables 225 to provide energy to the downhole equipment as per design. For example, in some embodiments, a landing nipple or landing profile may be formed on downhole equipment (e.g., a memory gauge or pump equipment), which may provide the connection location on the downhole equipment for the battery connection. Examples of different downhole equipment that may be powered by connected batteries 220, 222 include, but are not limited to, smart completion equipment installed around production tubing 240, such as sensors 241, packers 242, downhole pumps, downhole gauges, downhole interval control valves (ICVs), distributed permanent measurement systems, multi-trip connectors, control units, untethered robot systems, and other electrically powered downhole equipment.

In the embodiment shown in FIG. 2, a power supply system may have more than one battery 220, 222, where each battery is installed in a separate tunnel 211, 212. However, other embodiments may have less than two (one) battery/tunnel installation or more than two battery/tunnel installations. By providing multiple battery/tunnel installations around the well 200, a larger amount of energy may be provided from the power supply system while also allowing the batteries 220, 222 to fit within tunnels. Because tunnels 211, 212 may be limited in size due to being formed by radial drilling, the size and shape of a battery may be consequently limited. By distributing multiple batteries in multiple tunnels, the overall power supplied from the power supply system may be increased. Additionally, by distributing multiple battery/tunnel installations along the length of the well 200, power may be more easily supplied to different downhole equipment 241, 242 located along the length of the well 200.

Figure 3:
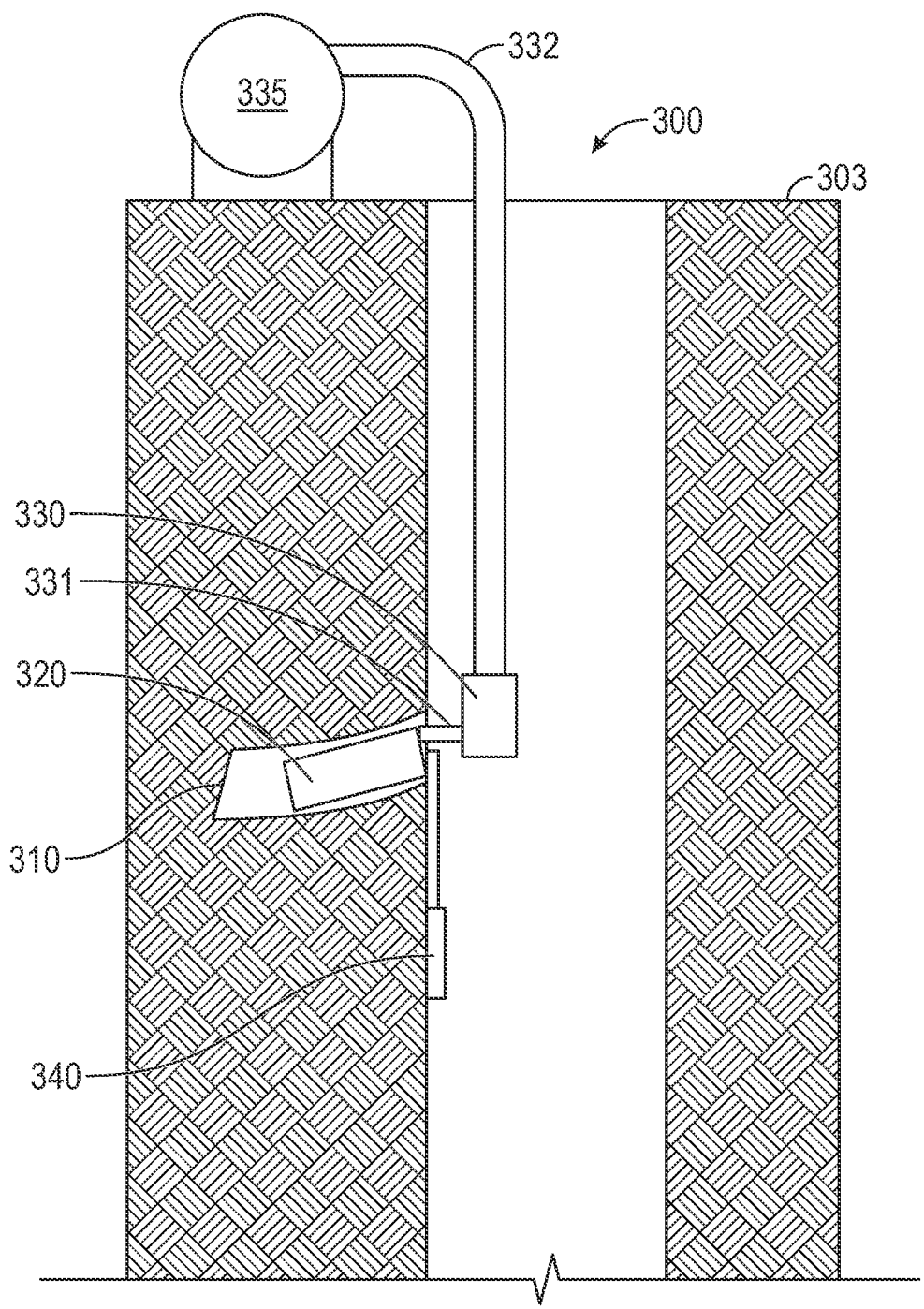
FIG. 3 shows an example of a power supply system according to embodiments of the present disclosure.

Referring now to FIG. 3, FIG. 3 shows another example of a power supply system according to embodiments of the present disclosure used in a well 300. The power supply system may include a battery 320 installed in a tunnel 310 formed off the well 300. The battery 320 may be connected to one or more downhole equipment 340, such as downhole sensors, to provide continuous power to the downhole equipment, or power as needed.

The power supply system may also include recharging equipment used to recharge the battery 320. The recharging equipment may include a recharging device 330 and a docking device 331, where the docking device 331 may be run downhole from the surface 303 of the well 300 via coiled tubing 332 (provided from a spool 335) or a wireline to be connected to the battery 320 for recharging. The recharging device 330 may be, for example, an energy harvesting device, a power connection (e.g., an electrical cable) electrically connected to a power source at the surface 303 of the well, or other type of charger. In such embodiments, recharging equipment may be temporarily run through the well 300 for recharging the battery 320 and then removed after charging. For example, a method of charging the battery 320 installed in the tunnel 310 may include running recharging equipment (e.g., docking device 331) through the well 300 to the battery 320, connecting the docking device 331 to the battery to recharge the battery 320, and after recharging, removing the recharging equipment from the well 300. In some embodiments, a docking device may be run into the well via coiled tubing, which may be run through the production tubing of the well. A battery may include a landing nipple or profile that may provide a connection location on the battery for connection with the docking device.

Figure 4:
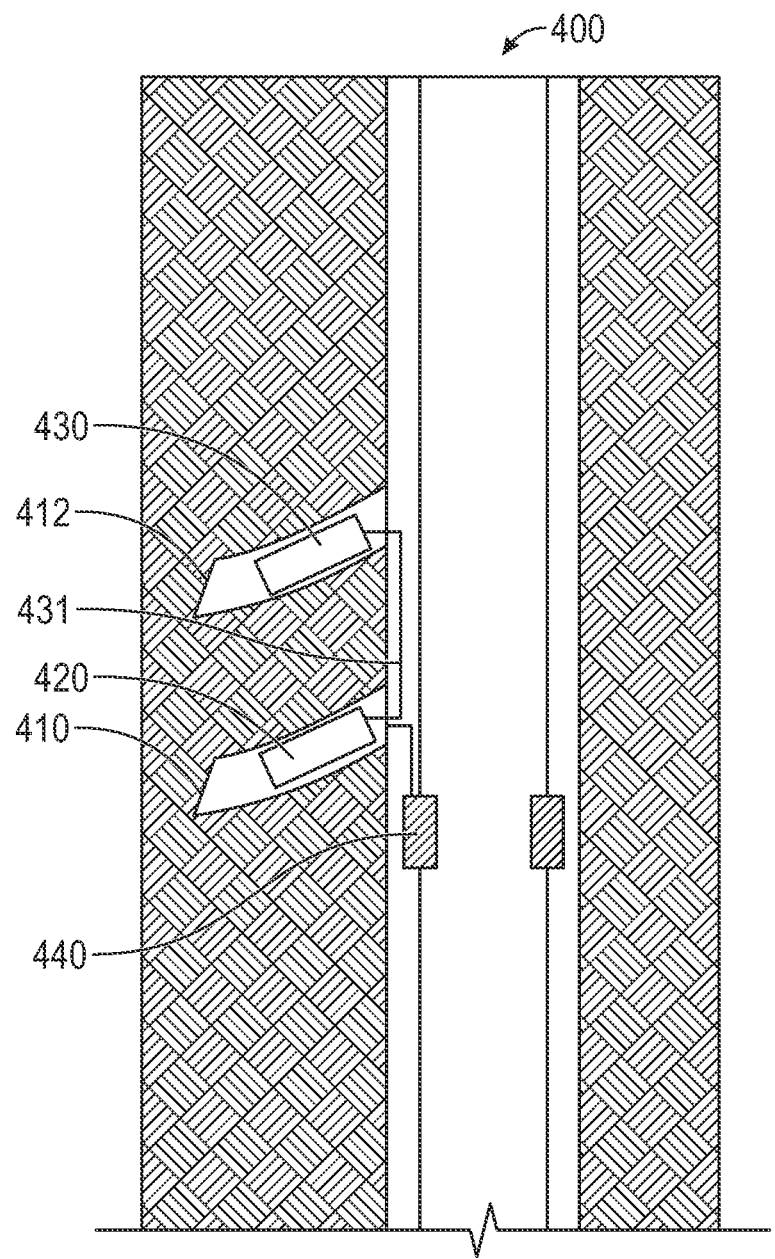
FIG. 4 shows an example of a power supply system according to embodiments of the present disclosure.

Referring now to FIG. 4, FIG. 4 shows another example of a power supply system according to embodiments of the present disclosure used in a well 400. The power supply system may include a battery 420 installed in a primary tunnel 410 formed off the well 400. The battery 420 may be connected to one or more downhole equipment 440 (e.g., a downhole measurement device or valve) to provide continuous power to the downhole equipment, or power as needed.

The power supply system may also include recharging equipment, including a recharging device 430 and an electrical connection 431 connecting the recharging device 430 to the battery 420. The recharging device 430 may be an energy harvesting device that may collect energy from the well environment, e.g., hydraulic energy from fluid moving through the well 400 or thermal energy and convert the collected energy to electrical power for recharging the battery 420.

For example, an energy harvesting device may include thermoelectric materials, which can harvest heat available from temperature gradients formed downhole and generate electricity from the application of the temperature gradient. A temperature gradient may be provided downhole, for example, by naturally occurring heat gradients through the formation and/or from the flow of different fluids through the well 400. In another example, an energy harvesting device may harvest energy from the flow of fluids around the energy harvesting device.

In another example, an energy harvesting device may include piezoelectric materials that can accumulate electric charge in response to an applied mechanical stress, e.g., bending movement or compression of a piezoelectric component resulting from fluid pressure on the piezoelectric piece. For example, an energy harvesting device may include a piezoelectric piece that may be positioned in a fluid path communicating with fluid flowing through the well 400 (e.g., produced hydrocarbons flowing through the well), where fluid movements around and/or through the energy harvesting device may convert the mechanical stress to electricity. Electricity accumulated in the energy harvesting device may then be directed to the battery 420 via an electrical connection 431.

Various types of downhole energy harvesting devices may be used to collect energy downhole. By connecting a downhole energy harvesting device to a battery stored in a tunnel off a well, according to systems described herein, the additional downhole space provided by the tunnel can be used to store collected energy which can be used to continuously power downhole equipment.

The recharging device 430 may be installed in a separate tunnel from the tunnel in which the battery 420 is held. For example, the battery 420 may be installed in the primary tunnel 410 at a first axial location along the well 400, and the recharging device 430 may be installed in a secondary tunnel 412 extending outwardly from the well 400 at a second axial location along the well 400, different than the primary tunnel 410. In some embodiments, more than one tunnel may be formed (e.g., using radial drilling) off a well to hold more than one battery 420 and/or more than one tunnel may be formed (e.g., using radial drilling) off a well to hold more than one energy harvesting device. As noted above, due to the relatively small size of tunnels formed using radial drilling (compared with conventionally formed wells), the size of equipment installed in such tunnels is likewise limited. Thus, by providing multiple tunnels, where a component of the power supply system may be installed in each tunnel, a larger number of components (e.g., batteries and energy harvesting devices) may be stored downhole, thereby increasing the available power supply downhole.

Figure 5:
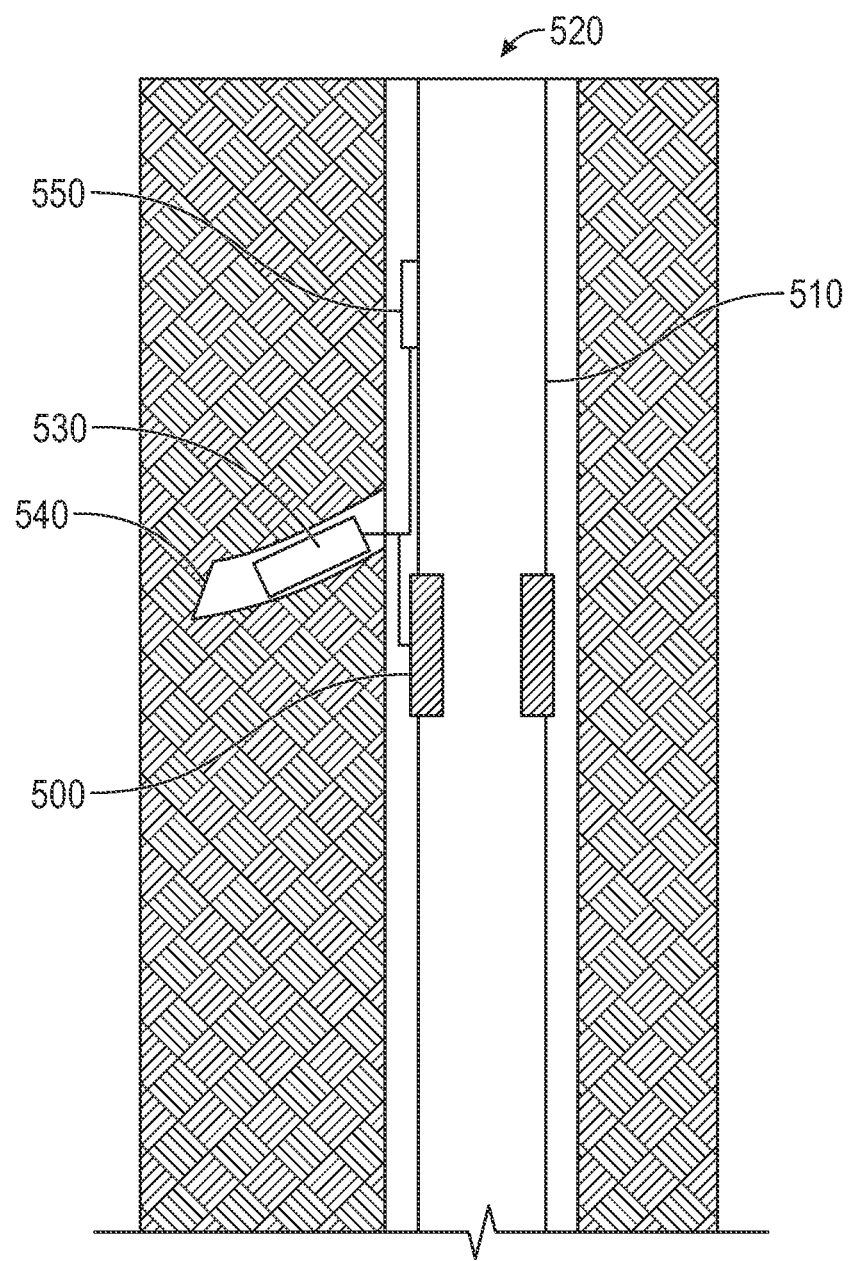
FIG. 5 shows an example of a power supply system according to embodiments of the present disclosure.

In some embodiments, an energy harvesting device may be provided on downhole equipment, e.g., production tubing, such as shown in FIG. 5. For example, as schematically shown in FIG. 5, an energy harvesting device 500 may be installed along production tubing 510 extending through a well 520 and connected to a battery 530 installed in a tunnel 540 formed off the well 520. As fluid flows through the production tubing 510, the energy harvesting device 500 may convert energy from the flowing fluid to electricity, where the produced electricity may be used to recharge the battery 530. The battery 530 may be connected to downhole equipment, such as sensors 550 or a pump, to power the downhole equipment.

Examples of power supply systems have been shown as being used with a vertical well, such as shown in FIGS. 2-5, extending from a surface a depth into a formation. However, power supply systems disclosed herein may also equally be used with horizontal wells and other directional wells. Further, power supply systems may be assembled in a main well, extending from and opening at the Earth's surface, or in a branch well, extending from and opening to a main well.

Figure 6:
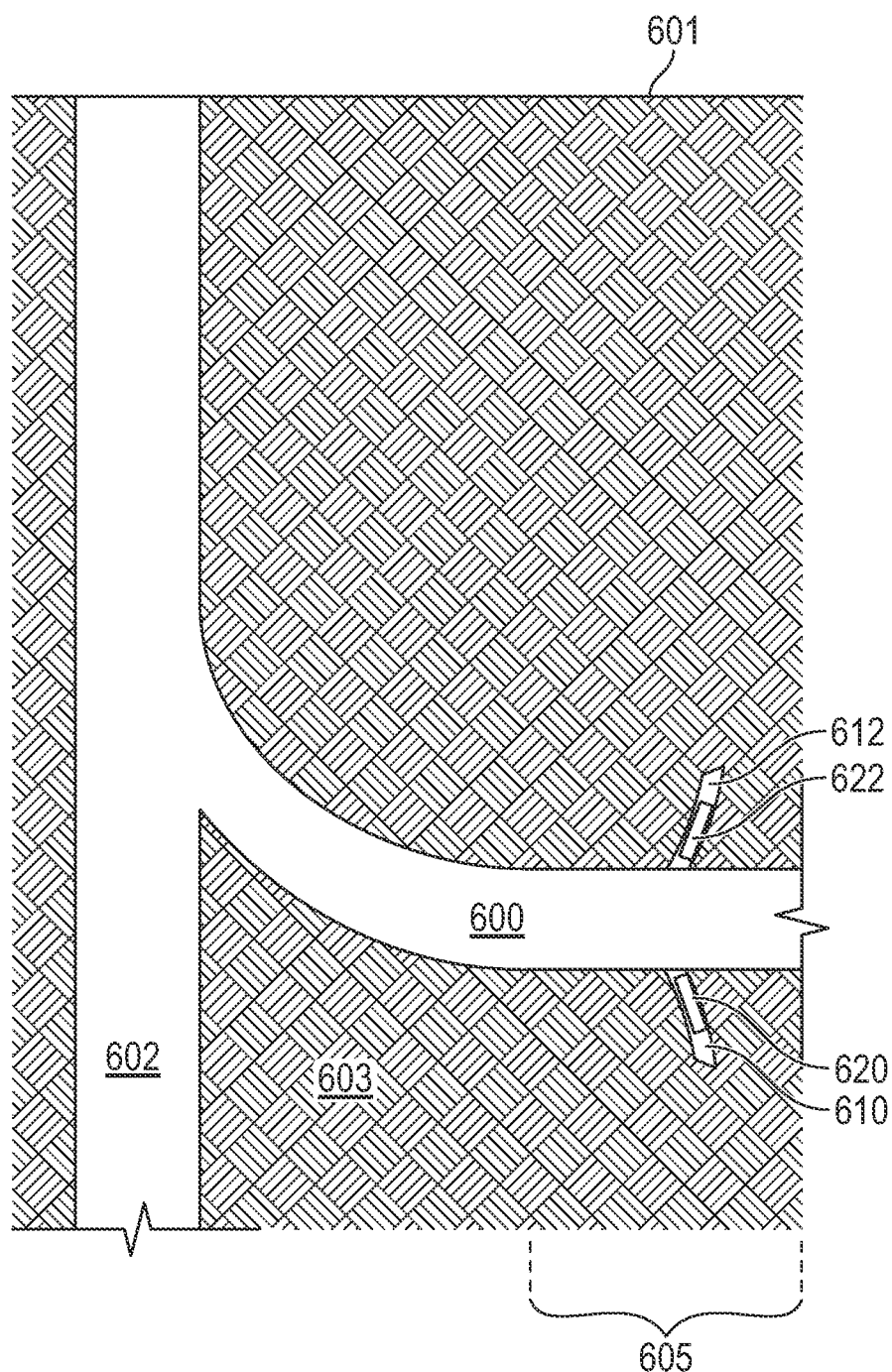
FIG. 6 shows an example of a power supply system in a well according to embodiments of the present disclosure.

For example, FIG. 6 shows an example of a power supply system installed in a horizontal portion 605 of a well 600. The well 600 may be a branch well that extends from a main well 602 to a reservoir formation, where the main well 602 may extend from a surface 601 through an underground formation 603. Both the main well 602 and the branch well 600 may be formed using conventional methods of drilling, for example, using a drill bit connected to and rotated by a drill string to drill into the formation 603 as drilling fluid is circulated through the well. A first primary tunnel 610 may be drilled outwardly from the horizontal portion 605 of the well 600 at a first axial location along the well 600. A first component 620 (e.g., a battery) of a power supply system according to embodiments of the present disclosure may be positioned in the first primary tunnel 610. An additional tunnel 612 may be drilled and extend outwardly from the well 600. A second component 622 (e.g., a recharging device or another battery) of the power supply system may be positioned in the additional tunnel 612.

In some embodiments, more than one power supply system component/tunnel installation may be provided at a single axial location along the well. In such embodiments, multiple tunnels may be formed at different circumferential locations around the well at the same axial location, where the tunnels may extend away from the well in different directions.

Figure 7:
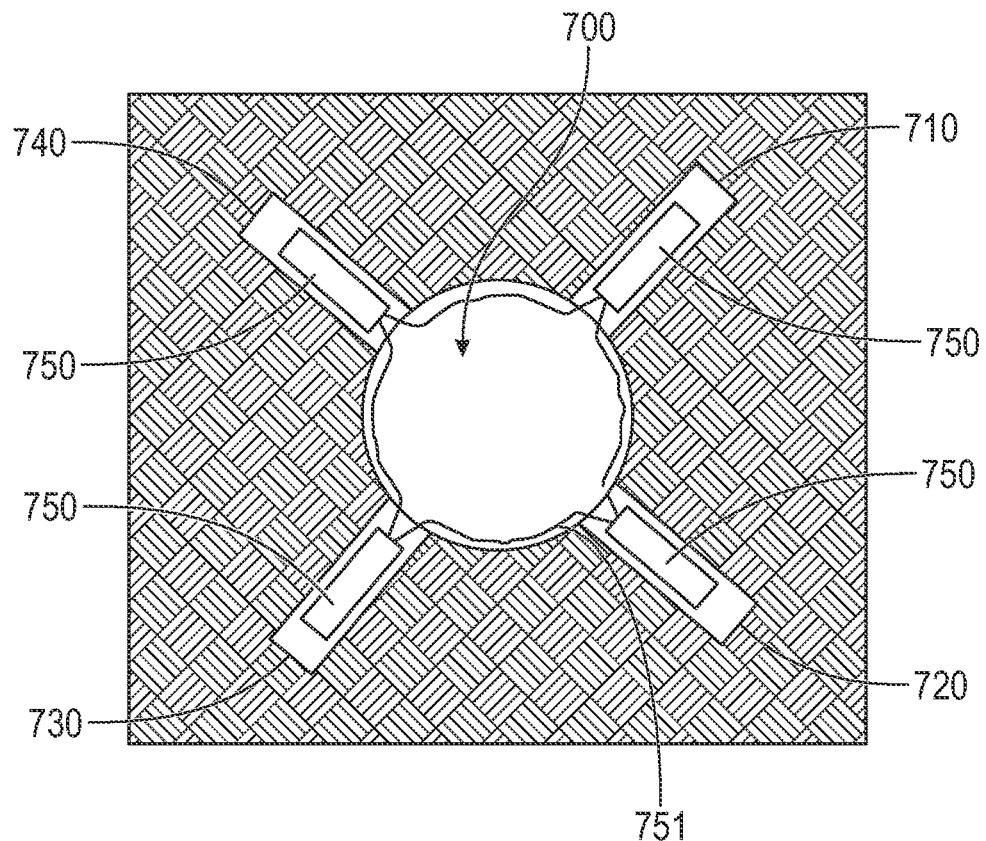
FIG. 7 shows an example of power supply system components stored in tunnels extending outwardly from a well according to embodiments of the present disclosure.

For example, FIG. 7 shows a cross-sectional view of a well 700 at an axial location along the well 700, where four tunnels 710, 720, 730, 740 extend outwardly from the well 700 in different directions at the same axial location along the well 700. Each tunnel 710, 720, 730, 740 may hold one or more components of a power supply system 750 according to embodiments of the present disclosure. The power supply system component in each tunnel may be connected to each other via one or more electrical cables 751, which may extend from a component 750 in one tunnel to another component 750 in another tunnel.

According to embodiments of the present disclosure, multiple tunnels may be drilled at a single axial location along a well using a simplified tunneling procedure including rotating a tunneling tool at the single axial location to drill the multiple tunnels. For example, in methods where tunnels are formed using mechanical radial drilling, a whipstock (e.g., 104 in FIG. 1) may be sent via a tubing (e.g., 105 in FIG. 1) to an axial location in a well and oriented in a first rotational position. A radial drilling bit (e.g., 108 in FIG. 1) may be directed through the whipstock to drill outwardly from the well into the surrounding formation in a first direction. After drilling a length into the formation to form a first tunnel, the radial drilling bit may be retracted and the whipstock may be rotated (e.g., a quarter turn) while remaining in the axial location to a second rotational position. The radial drilling bit may then be redirected through the whipstock to drill outwardly from the well into the formation in a second direction. After drilling a length into the formation to form a second tunnel, the radial drilling bit may be retracted and the whipstock may be rotated (e.g., a quarter turn) while remaining in the axial location to a third rotational position. The radial drilling bit may then be redirected through the whipstock to drill outwardly from the well into the formation in a third direction. Such rotation and drilling process may be repeated to form additional tunnels at the same axial location. Using such rotation and drilling process may allow for formation of multiple tunnels in a single location, without having to move and reposition a whipstock to different axial locations along the well.

After one or more tunnels are drilled off a well, power supply system components may be installed within the tunnel(s). According to embodiments of the present disclosure, the same tools used to drill the tunnel may also be used to land components of a power supply system inside the drilled tunnel (e.g., coiled tubing or drill string). For example, in some embodiments, a component of a power supply system (e.g., a battery) may be installed within a tunnel using the same whipstock that was used to direct a radial drilling tool to drill the tunnel. In such embodiments, the component of the power supply system may be directed through the whipstock and into the tunnel using a flexible running tool. The running tool may hold the component in an orientation that when the running tool releases the component, an electrical connection port may face toward the well for electrical connection to other component(s). According to some embodiments, components of a power supply system may be held within a tunnel by frictional forces (e.g., where an outer diameter of the component contacts the inner diameter of the tunnel), gripping elements (e.g., a separate packer element installed around the component), and/or gravity.

In some embodiments, a system may be designed to hold components of a power supply system within tunnels extending from a horizontal portion of a well such that the component(s) are held in the tunnels even while fluids are being circulated through the well. For example, in some embodiments, when tunnels are drilled off a horizontal portion of a well, components of a power supply system may be held inside tunnels extending laterally or in a downward direction from the horizontal portion. In some embodiments, when tunnels are drilled off a horizontal portion of a well, power supply system components (e.g., batteries and energy harvesting devices) may be held inside tunnels extending from the horizontal portion of the well using gripping elements, such as a separate small packer installed around the component to hold the component within the tunnel.

In embodiments where a power supply system has multiple components installed in multiple tunnels, the components may be connected together before or after installing each component in their respective tunnels. For example, according to embodiments of the present disclosure, a battery may be installed in primary tunnel extending from a well at a first axial location along the well, and a second battery or an energy harvesting device may be installed in a secondary tunnel extending from the well at a different, second axial location along the well. The component in the secondary tunnel may then be connected to the battery in the primary tunnel.

The configuration of a power supply system according to embodiments of the present disclosure, including, for example, the number of tunnels drilled off a well, the types of components installed in the tunnels, and the type of recharging equipment selected to recharge batteries in the power supply system, may be designed according to energy requirements for downhole equipment to be used in a well.

Figure 8:
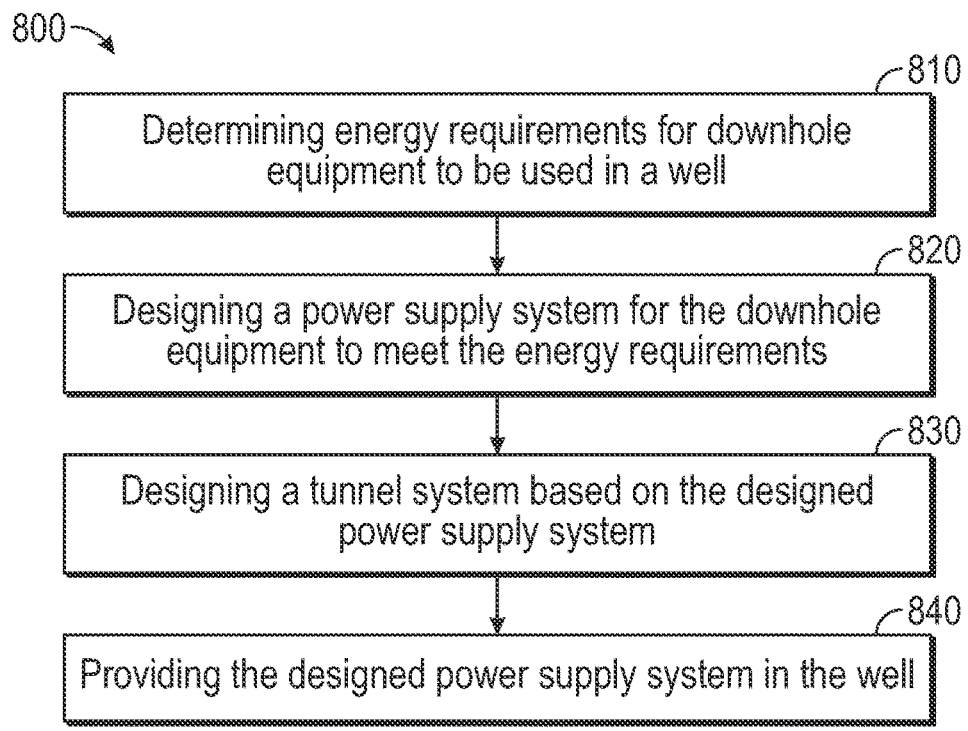
FIG. 8 shows an example of a method according to embodiments of the present disclosure.

For example, FIG. 8 shows an example of a method 800 for designing a power supply system according to embodiments of the present disclosure. One or more steps shown in the example may be repeated or omitted in various embodiments according to the present disclosure. Additionally, methods according to embodiments of the present disclosure may include additional steps, as described herein, that may not be shown in FIG. 8.

The method 800 may include determining energy requirements for downhole equipment to be used in a well (step 810). For example, a smart completions system in a well may include multiple data-collecting equipment (e.g., sensors), electrically controlled components (e.g., which may be automated or controlled from a surface of the well), and other permanently installed, electrically powered equipment (e.g., valves, pumps, gauges, controllers, etc.). Other examples of well systems using electrically powered equipment installed downhole may include smart well monitoring systems and downhole well control systems. Energy requirements for equipment to be used in one or more well systems may be determined, for example, based on the amount of power each electrically powered equipment uses and the amount of operational time expected for each electrically powered equipment.

A power supply system may be designed for the downhole equipment to meet the energy requirements (step 820). Design considerations for the power supply system may include selecting an amount of rechargeable batteries to power selected downhole equipment (e.g., based on the downhole battery and energy requirements for the selected downhole equipment), determining a suitable location for batteries along the well, selecting a type of recharging equipment to recharge the batteries, and locating a suitable depth for the recharging equipment (e.g., determining a location for downhole energy harvesting devices along the well).

A tunnel system may be designed based on the designed power supply system (step 830). For example, designing the tunnel system may include selecting a number of tunnels to fit the designed power supply system, and selecting locations for the tunnels based on designed locations for the system components along the well.

After designing a power supply system according to embodiments of the present disclosure to meet the energy requirements for selected downhole equipment in a well, the designed power supply system may be formed and installed in the well (step 840). Providing the designed power supply system in a well may include drilling the designed tunnel system in the well (e.g., drilling at least one tunnel extending outwardly from the well using radial drilling or other tunneling technique), and installing the components of the designed power supply system in the well, wherein at least one component (e.g., a battery) may be installed in the tunnel(s). For example, at least one component in a designed power supply system may be a rechargeable battery, which may be installed in a drilled primary tunnel, and an energy harvesting device may be selected as the type of recharging equipment, which may be installed in a drilled secondary tunnel, where the energy harvesting device may be connected to the rechargeable battery.

Figure 9:
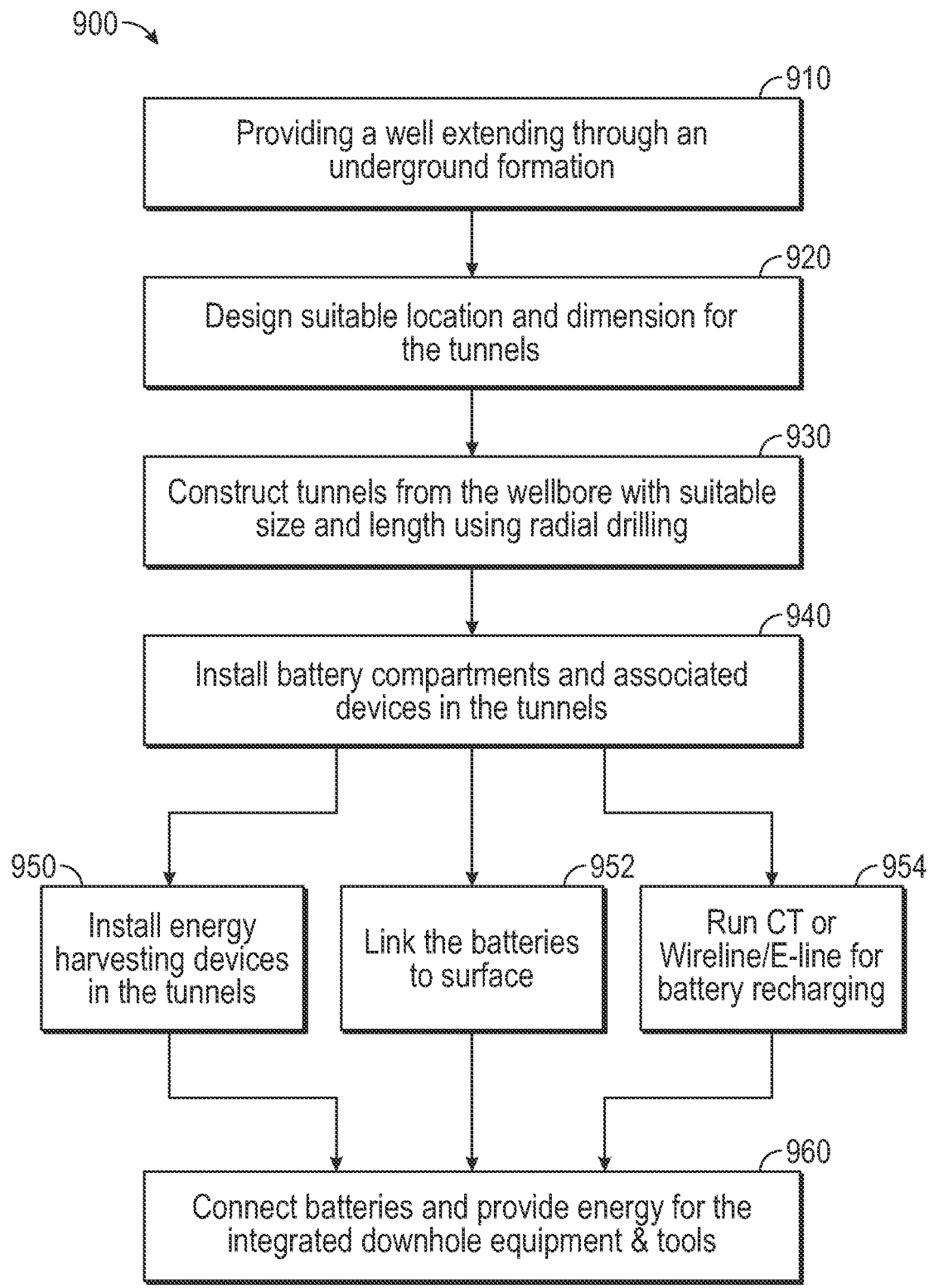
FIG. 9 shows an example of a method according to embodiments of the present disclosure.

Referring now to FIG. 9, FIG. 9 shows an example of a method 900 for providing a power supply system in a well according to embodiments of the present disclosure. One or more steps shown in the example may be repeated or omitted in various embodiments according to the present disclosure. Additionally, methods according to embodiments of the present disclosure may include additional steps, as described herein, that may not be shown in FIG. 9.

As shown, the method 900 may include providing a well extending through an underground formation (step 910). A power supply system according to embodiments of the present disclosure may be designed to power one or more downhole equipment to be used in the well (e.g., using methods such as described above with respect to FIG. 8). Tunnels may be designed according to the power supply system design (step 920), including, for example, selecting the number of tunnels needed to hold components of the power supply system, designing tunnel location(s) along the well, and designing tunnel sizes (e.g., length and diameter). For example, prior to drilling a tunnel, a battery for use in the power supply system may be selected based on energy requirements for selected downhole equipment. The size of the tunnel may then be designed based on a size of the selected battery. The axial location of the tunnel along the well may be selected based on a location of the downhole equipment to be powered.

Tunnel(s) may then be drilled from the well using radial drilling or other tunneling technique (step 930). For example, at least one primary tunnel may be drilled using radial drilling to extend outwardly from the well at a first axial location along the well and/or multiple tunnels may be drilled from the well at multiple axial locations along the well.

After one or more tunnel(s) are drilled from the well, one or more batteries may be installed in the tunnel(s) (step 940). Additionally, after one or more tunnel(s) are drilled from the well, selected recharging equipment may be installed in the well. For example, in designed power supply systems using energy harvesting devices to recharge installed batteries, energy harvesting devices may be installed in additional tunnel(s) drilled from the well (step 950) and/or energy harvesting devices may be provided on downhole tools. In other embodiments, selected recharging equipment may include an e-line, where the e-line may be installed in the well by linking one end of the e-line to a battery installed in a tunnel and the linking another end of the e-line to a power source at the surface of the well (step 952). In other embodiments, selected recharging equipment may be linked to a battery installed in a tunnel by running a recharging device downhole via coiled tubing, wireline, or e-line (step 954). Different types of recharging equipment may be installed or used downhole, such as described herein, which may be selected, for example, based on the well operation to be performed and associated well equipment being used.

When recharging equipment is installed in the well, the recharging equipment may be connected to one or more batteries installed in tunnels off the well (step 960). For example, in some embodiments, a recharging device installed in one tunnel may be connected singly to one battery installed in a different tunnel, or a recharging device installed in one tunnel may be connected to multiple different batteries installed in multiple different tunnels.

In some embodiments, a battery installed in a tunnel may be recharged from downhole recharging equipment during or after performing a well operation. For example, a well operation may include a workover operation, such as a repair job or stimulation of an existing production well, a maintenance procedure performed on the well, a remedial treatment on the well, or an operation that includes the removal and/or replacement of a production string from the well (e.g., after the well has been killed and a workover rig has been placed at the well), where battery recharging may be performed during or after the well operation. In some embodiments, a well operation may include moving a downhole tool (e.g., a production string) through the well and past a battery/tunnel installation to perform a well operation. By providing batteries in tunnels formed off the well, downhole tools may be passed through the well and past the batteries without interference from the batteries.

According to embodiments of the present disclosure, after a power supply system is installed downhole, one or more components of the power supply system may be removed (e.g., upon conclusion of using the power supply system, for repair or replacement of a power supply system component, and/or to reconfigure the power supply system). In some embodiments, brine may be circulated through the well as one or more components of a power supply system is removed. For example, a battery may be removed from a tunnel by pulling the battery out of the tunnel (e.g., using a running tool), and circulating brine through the well as the battery is removed.

Methods and systems described herein may be used in vertical well sections, horizontal well sections, and other directional well sections for various applications. Examples of applications in which methods and system described herein may be used include, but are not limited to, providing prolonged downhole energy, providing continuous downhole power generation, providing downhole power to smart downhole equipment (e.g., for smart well monitoring), providing power for wireless downhole control, and providing power for downhole completion automation.

By using methods and systems described herein, batteries may be stored downhole and used, as desired, for various well applications. By storing batteries in tunnels off a well, well operations may be conducted without interference from the batteries. By providing recharging equipment downhole, e.g., installed in separate tunnels or connected via a line to the surface, batteries may be recharged without intermittent shutdown times.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A method, comprising:
providing a well extending through an underground formation;
drilling a primary tunnel within a non-producing area off the well, extending in a radially outward direction from the well at a first axial location along the well;
installing a battery in the primary tunnel;
connecting the battery to downhole equipment in the well, wherein the downhole equipment is not disposed in the primary tunnel; and powering the downhole equipment in the well via the battery.

2. The method of claim 1, further comprising:
using radial drilling to drill a secondary tunnel extending in an outwardly direction from the well;
installing an energy harvesting device in the secondary tunnel; and
connecting the energy harvesting device to the battery.

3. The method of claim 1, wherein the battery is connected via an e-line to a power source at a surface of the well.

4. The method of claim 1, further comprising:
moving a downhole tool through the well and past the primary tunnel to perform a well operation.

5. The method of claim 1, further comprising:
running recharging equipment through the well to the battery;
connecting the recharging equipment to the battery to recharge the battery; and
after recharging, removing the recharging equipment from the well.

6. The method of claim 1, further comprising:
prior to drilling the primary tunnel, selecting the battery based on energy requirements for the downhole equipment;
designing a size of the primary tunnel based on a size of the battery; and
selecting the first axial location based on a location of the downhole equipment.

7. The method of claim 1, further comprising:
pulling the battery out of the primary tunnel; and
circulating brine through the well as the battery is removed.

8. The method of claim 1, wherein the radial drilling comprises using a whipstock to orient a radial drilling bit in the outwardly direction from the well as the radial drilling bit drills the primary tunnel, wherein the method further comprises:

rotating the whipstock in the well to orient the radial drilling bit in a second outwardly direction from the well; and
drilling an additional primary tunnel in the second outwardly direction from the well at the first axial location.

9. A method, comprising:
determining energy requirements for downhole equipment to be used in a well;
designing a power supply system for the downhole equipment to meet the energy requirements, wherein designing the power supply system comprises:
selecting an amount of rechargeable batteries to power the downhole equipment; and
selecting a type of recharging equipment to recharge the rechargeable batteries;
drilling a tunnel system comprising a selected number of tunnels based on the selected amount of rechargeable batteries,
wherein each of the tunnels is drilled within a non-producing area off the well, and wherein the
selected number of tunnels comprises a primary tunnel extending in a radially outwardly direction from the well;
installing the designed power supply system in the well comprising installing at least one component of the designed power supply system in the primary tunnel, wherein the downhole equipment is not disposed in the primary tunnel; and
powering the downhole equipment via the designed power supply system.

10. The method of claim 9, wherein the at least one component is a rechargeable battery installed in the primary tunnel, wherein an e-line is selected as the type of recharging equipment, and wherein the method further comprises:
connecting the e-line to the rechargeable battery, wherein the e-line extends from a power source at a surface of the well.

11. The method of claim 9, wherein the at least one component is a rechargeable battery installed in the primary tunnel;
wherein an energy harvesting device is selected as the type of recharging equipment;
wherein drilling the designed tunnel system in the well further comprises:
using radial drilling to drill a secondary tunnel extending in an outwardly direction from the well; and
wherein installing the designed power supply system in the well further comprises:
installing the energy harvesting device in the secondary tunnel; and
connecting the energy harvesting device to the rechargeable battery.

12. A system, comprising:
a well extending through an underground formation;
a primary tunnel extending a length radially outwardly from the well at a first axial location along the well, the primary tunnel extending within a non-producing area off the well;
a battery installed in the primary tunnel;
recharging equipment connected to the battery; and
electrically powered downhole equipment positioned in the well, wherein the downhole equipment is connected to the battery and powered by the battery, wherein the downhole equipment is not disposed in the primary tunnel.

13. The system of claim 12, wherein the length of the primary tunnel is less than 300 feet.

14. The system of claim 12, wherein the well is a branch well extending from a main well, and the main well extends underground from a surface.

15. The system of claim 12, wherein the downhole equipment comprise downhole sensors.

16. The system of claim 12, wherein the recharging equipment comprises a docking device connected to the battery, wherein the docking device is connected to a power source at a surface of the well and is run into the well via coiled tubing or wireline.

17. The system of claim 12, further comprising an additional primary tunnel at the first axial location extending outwardly from the well in a different direction from the primary tunnel.

18. The system of claim 12, further comprising:
an additional tunnel extending outwardly from the well;
wherein the recharging equipment is an energy harvesting device installed in the additional tunnel.

19. The system of claim 12, wherein the primary tunnel has a diameter less than 7inches.

20. The system of claim 12, wherein the primary tunnel extends outwardly from a horizontal section of the well.

* * * * *